United States Patent [19]

Shimizu et al.

[11] Patent Number: 4,869,765

[45] Date of Patent: Sep. 26, 1989

[54] PRODUCTION PROCESS OF BOBBIN FOR VOICE COIL

[75] Inventors: Tokichi Shimizu; Koyoshi Shimoyama, both of Kiryu, Japan

[73] Assignee: Meisei Industry Co., Ltd., Gunma, Japan

[21] Appl. No.: 239,311

[22] Filed: Sep. 1, 1988

[30] Foreign Application Priority Data

Sep. 2, 1987 [JP] Japan ................................ 62-217895
Oct. 13, 1987 [JP] Japan ................................ 62-256223

[51] Int. Cl.$^4$ ................................................ B32B 1/00

[52] U.S. Cl. ...................................... 156/201; 29/605; 156/203; 156/250; 381/194

[58] Field of Search ......................... 156/184, 200–203, 156/250, 193, 466, 465; 381/194, 195; 29/605

[56] References Cited

U.S. PATENT DOCUMENTS

| | | | |
|---|---|---|---|
| 3,193,627 | 7/1965 | Hecht | 381/194 X |
| 3,267,968 | 8/1966 | Foll et al. | 381/194 X |
| 3,284,581 | 11/1966 | Fender | 381/194 |
| 3,314,133 | 4/1967 | Stahl | 29/605 |
| 3,792,394 | 2/1974 | Bertagni | 381/194 X |
| 4,225,756 | 9/1980 | Babb | 29/605 X |

*Primary Examiner*—David Simmons
*Attorney, Agent, or Firm*—Sherman and Shalloway

[57] ABSTRACT

A process is disclosed for the production of bobbins suitable for use in voice coils. A bobbin tape is gradually rolled into a cylindrical shape around a mandrel having a circular cross-section while feeding the bobbin tape along the longitudinal axis of the mandrel, whereby both longitudinal edges of the bobbin tape are brought into an opposing relationship. Plural shape-retaining tapes are caused to adhere on the thus-rolled bobbin tape at intervals equal to the length of each of the bobbins without covering coil-winding portions, so that both longitudinal edges of the bobbin tape are maintained in the opposing relationship. The resultant bobbin tape is then cut at intervals equal to the length of each of the bobbins from the leading end of the bobbin tape while leaving at least one shape-retaining tape on the side of the trailing end of the bobbin tape. The cutting may also be performed at intervals equal to the total length of plural ones of the bobbins to provide continuous bobbin stocks.

15 Claims, 3 Drawing Sheets

PRODUCTION PROCESS OF BOBBIN FOR VOICE COIL

BACKGROUND OF THE INVENTION (1) Field of the Invention

This invention relates to a process for the production of bobbins suitable for use in voice coils of speakers.

(2) Description of the Related Art

FIGS. 7(*a*) through 7(*c*) illustrate a usual process for the manufacture of voice coils. First of all, a bobbin 12 is fit on the outer peripheral wall of a cylindrical jig 11 as shown in FIG. 7(*a*). The bobbin 12 is generally made of paper, but an aluminum foil or the like may also be used in some instances. The cylindrical jig 11 is used for the maintenance of the roundness of a voice coil and its positioning upon its manufacture and its assembly in a speaker. The cylindrical jig 11 is therefore pulled out after the assembly of the voice coil in the speaker. A coated wire is next wound in layers without spacing between adjacent turns and between adjacent layers on the bobbin 12 as depicted in FIG. 7(*b*), so that a coil 13 is formed and leads 14 of the coil 13 are caused to extend in the direction of the longitudinal axis of the bobbin 12. Thereafter, a holding tape (or an adhesive) 15 is caused adhere on the bobbin 12 in such a way that the holding tape 15 holds the lead 14 in adjacent to the coil 13 as illustrated in FIG. 7(*c*). A voice coil 16 in a form fitted on the cylindrical jig 11 is completed as described above.

Incidentally, the outer peripheral wall of the bobbin 12 has been coated in advance with an adhesive which is soluble in an alcohol. The coated wire, which has been coated beforehand with an alcoholic solvent and is self-bonding, is wound on the outer peripheral wall of the bobbin 12. When they are heated and dried, the bobbin 12 and coil 13 are unified.

FIG. 8 schematically illustrates a conventional process for the production of bobbins suitable for use in such voice coils. Two bobbin tapes **20*a*,20*b* are used. One of the tapes, namely, the inner tape 20*a* is helically wound with its both side edges maintained in abutment, and the other tape, namely, the outer tape 20*b* is also helically wound on the tape 20*a* in such a way that the abutment between both side edges of the tape 20*b* is displaced by half a pitch from that of the tape 20*a*. The tapes 20*a*,20*b* are bonded together with an adhesive (not shown) to form a double-walled tube 21, which is then cut into a prescribed length so as to obtain the bobbin 12**.

A bobbin produced in such a manner as described manner tends to develop air bubbles in the adhesive layer between the inner and outer tapes **20*a*,20*b* upon drying, so that its quality is instable. Even if such bubbles cause no problem at the stage of production of a voice coil, there is a potential problem that after assembled in a moving-coil speaker, the bubbles may expand under heat to deform the voice coil, the clearance between the voice coil and the associated pole plates of the moving-coil speaker may hence vary or the voice coil may thus contact either one or both of the associated pole plates, and the performance of the moving coil speaker may be deteriorated accordingly. There is another potential problem that since the double-walled tube formed by helically winding the tapes is cut at a right angle relative to the axis of the tube, the side edges of each of the tapes 20*a*,20*b* both extends at an acute angle relative to each of the thus-cut ends of the bobbin and the tapes 20*a*,20*b*** are hence prone to peeling at the ends of the bobbin.

With a view toward solving such problems or in the case of a tape hard to be formed into such a helically-wound double-walled tube as in FIG. 8, it is also practised to form the bobbin 12 by cutting a paper tape into a short strip, rolling the short paper strip (which is designated at numeral 22 in FIG. 9) around an unillustrated cylindrical jig with both side edges 24 of the short strip opposing each other as depicted in FIG. 9 and then tentatively holding the opposing side edges 24 with an adhesive tape 25, a rubber band or the like at an area not extending to a coil-winding portion 23.

Since the short paper strip is rolled into the cylindrical shape in the above process, there is a potential problem that an axial displacement may often occur between the opposing side edges 24 as shown in FIG. 10 and the short paper strip 22 may thus be peeled off at corners thereof due to the displacement to result in poor performance. Although it is also practised to use a round-cornered paper strip 22 as shown in FIG. 11 with a view toward avoiding such a problem, this approach is accompanied by a further problem that the use of such a round-cornered paper strip unavoidably leads to a higher manufacturing cost because it must be formed by die punching.

SUMMARY OF THE INVENTION

An object of this invention is to provide a process for the production of bobbins suitable for use in voice coils, which process is suited for continuous production and can improve the productive efficiency.

Another object of this invention is to prevent peeling-off or ripping-off at the opening ends of a bobbin to be obtained.

A further object of this invention is to simplify the production process of bobbins and hence to reduce their production cost.

In one aspect of this invention, there is thus provided a process for the production of bobbins suitable for use in voice coils, which comprises:

gradually rolling a bobbin tape into a cylindrical shape around a mandrel having a circular cross-section while feeding the bobbin tape along the longitudinal axis of the mandrel, whereby both longitudinal edges of the bobbin tape are brought into an opposing relationship;

causing plural shape-retaining tapes to adhere on the bobbin tape, which has been formed into the cylindrical shape, at intervals equal to the length of each of the bobbins without covering coil-winding portions, so that both longitudinal edges of the bobbin tape are maintained in the opposing relationship; and cutting the bobbin tape, which has been formed into and maintained in the cylindrical shape, at predetermined intervals from the leading end of the bobbin tape while leaving at least one shape-retaining tape on the side of the trailing end of the bobbin tape.

Upon cutting the bobbin tape formed into and maintained in the cylindrical shape, the cutting intervals may be equal to the length of each of the bobbins or the total length of plural bobbins.

According to the present invention, the bobbin tape is gradually rolled into the cylindrical shape around the mandrel and the shape-retaining tapes are caused to adhere on the opposing side edges at intervals equal to the length of each bobbin, so that the bobbin tape is firstly retained in the cylindrical shape. Cutting is thereafter conducted. The process of this invention therefore does not develop problems such as troubles caused by air bubbles entrapped within an adhesive layer between two tapes or peeling-off at the cut ends of a bobbin unlike the conventional process in which two tapes for voice coils are helically wound one over another with a displacement of half a pitch and then cut into prescribed lengths. The process of this invention is also free from an axial displacement at the opposing side edges of a tape in a bobbin unlike the conventional process in which a short strip of the length equal to the length of a single bobbin is rolled into a cylindrical shape and then adhered by a shape-retaining tape. In addition, the process of this invention allows to conduct the production of bobbins in a continuous operation, so that the productivity can be improved and the production cost can be reduced.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
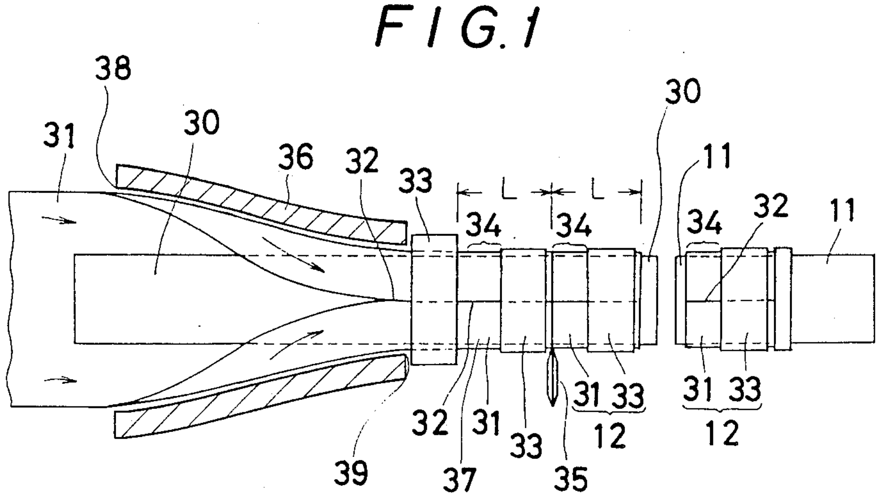
FIG. 1 is a partly cut-away plan view illustrating a production process according to a first embodiment of this invention, which is employed for the production of bobbins suitable for use in voice coils.

The process according to the first embodiment of this invention is now described with reference to FIG. 1. A bobbin tape 31 made of kraft paper or an aluminum foil is fed in the direction of the axis of a fixed mandrel 30 having a circular cross-section, so that the tape 31 is caused to travel through a forming tube 36 provided in the vicinity of the mandrel 30. Here, the feeding of the tape 31 is performed, for example, by holding the tape 31 between convex rollers whose peripheral walls are formed convex and their corresponding concave rollers whose peripheral walls are formed concave and then driving the convex and concave rollers in such a way that the tape 31 is curled in a direction transverse to the longitudinal axis thereof. The forming tube 31 is constructed with its inner diameter decreasing gradually from its inlet 38 toward its outlet 39. While the tape 31 is caused to pass through the forming tube 36, it is gradually rolled around the mandrel 30 and when both side edges of the tape 31 have been bought into abutment against each other, the tape 31 is imparted with a cylindrical shape. As a cylindrically-shaping device for performing such forming, it may be possible to use, instead of the above-described forming tube 36, a forming roller or die device constructed in such a way that the tape 31 is gradually rolled by forming rollers or dies arranged in several stages. The side edges 32 of the tape 31 may be in mutual abutment as illustrated in FIG. 1 or may be opposing each other with a small gap therebetween.

The mandrel 30 and forming tube 36 may be made of a metal or a plastic material, for example, aluminum, stainless steel or polyfluorinated ethylene.

Shape-retaining tapes 33 are next caused to adhere on the bobbin tape 31, which has been formed into the cylindrical shape, so as to hold both side edges 32 in abutment. As viewed in the circumference of the bobbin tape 31 formed into the cylindrical shape, the shape-retaining tapes 33 has such a length that it may extend over about 180 degrees in opposite directions from the thus-abutted side edges 32 (see FIG. 3). This adhesion of the shape-holding tapes 33 is carried out at intervals equal to the length of each bobbin, namely, at intervals of L without covering each coil-winding portion 34 around which a coil will be wound subsequently. The adhesion of each shape-retaining tape 33 is performed on the mandrel 30. Whenever the shape-holding tape 33 is applied, the travelling of the bobbin tape 31 is stopped and after completion of the adhesion of the shape-holding tape 33, the bobbin tape 31 is caused to travel over a distance equal to the length L of each bobbin. Incidentally, the feeding of the bobbin tape 31 may also be performed by pulling the resulting tube with the shape-holding tapes 33 adhered thereon. The bobbin tape 31 is fed intermittently in the above-described manner. Although conventional adhesive tapes may be used as the shape-retaining tapes 33, paper tapes whose insides have been coated with an alcoholic solvent may also be used since the outside of the bobbin tape 31 has been coated in advance with an adhesive soluble in alcohols.

As the adhesive soluble in alcohols, a polyamide-base adhesive may be mentioned by way of example. On the other hand, illustrative examples of the alcoholic solvent may include methanol, ethanol and the like. Owing to the adhesion of the shape-retaining tapes 33, the bobbin tape 31 formed into the cylindrical shape will be maintained in the same shape.

The bobbin tape 31 maintained in the cylindrical shape will next be cut from the leading end thereof at intervals equal to the length L of each bobbin. This cutting is carried out in such a state that at least one shape-retaining tape 33 is left on the side of the trailing end of the bobbin tape 31, in other words, on the side nearer to the origin of the bobbin tape 31, i.e., on the proximal side 37. This cutting can be achieved by causing a cutter 35 to run along the circumference of the bobbin tape 31 formed in the cylindrical shape around the mandrel 30 while pressing the cutter 35 against the bobbin tape 31. Needless to say, the cutting is conducted while the travelling of the bobbin tape 31 is stopped. According, the above-mentioned adhesion of each shape-retaining tape 33 and this cutting of the bobbin tape may conveniently be synchronized. This cutting provides a single piece of the bobbin 12, which is thereafter pulled off from the mandrel 30.

Figure 2:
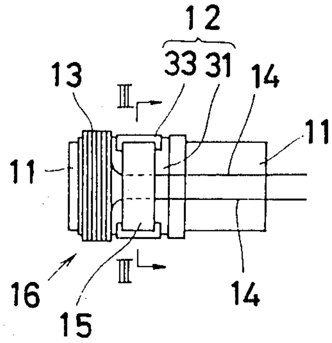
FIG. 2 is a front view of a voice coil manufactured using a bobbin produced by the process.
Figure 3:
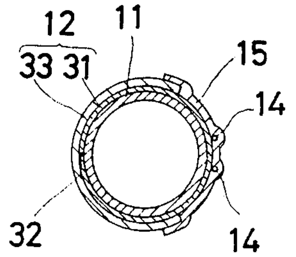
FIG. 3 is a cross-sectional view taken in the direction of arrows III—III of FIG. 2.

If the cylindrical jig 11 is arranged at a location advanced from the mandrel 30 as viewed in the travelling direction of bobbin tape 31 before the bobbin 12 is pulled off from the mandrel 30, the bobbin 12 can be fit on the cylindrical jig 11 upon pulling-off of the bobbin 12 from the mandrel 30. Thereafter, a coated wire such as an enameled wire is wound around the coil-winding portion 34 of the bobbin 12 so as to form a coil 13 as shown in FIG. 2. A holding tape 15 is then caused to adhere to hold the leads 14 as illustrated in FIG. 3, so that the voice coil 16 has been completed.

Figure 4:
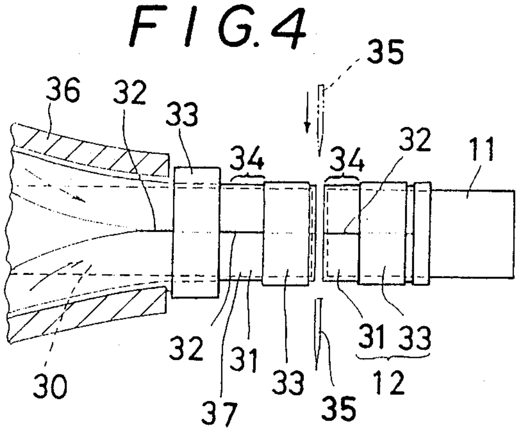
FIG. 4 is a partly cut-away plan view showing another cutting method of a cylindrical tape.

In the embodiment described above, the cutting of the bobbin tape 31 maintained in the cylindrical shape is conducted on the mandrel 30. This cutting may also be effected by cutting the bobbin tape 31 with a shape cutting means such as a blade knife in a direction perpendicular to the axis of the bobbin tape 31 of the cylindrical shape at a position advanced a little in the travelling direction of the bobbin tape 31 from the right-hand end of the mandrel 30 as viewed in FIG. 4. In this case, the cylindrical shape can be prevented from collapse provided that as shown in FIG. 4, the cylindrical jig 11 is arranged at a location advanced from the right-hand end of the mandrel 30 as viewed in the travelling direction of bobbin tape 31, a portion of the bobbin tape 31 formed into the cylindrical shape is fit on the cylindrical jig 11 and the cutting of the tape 31 is effected between the mandrel 30 and cylindrical jig 11. This cutting method has another advantage that the resultant bobbin 12 can be passed immediately to the coil-winding step in the same state.

Figure 5:
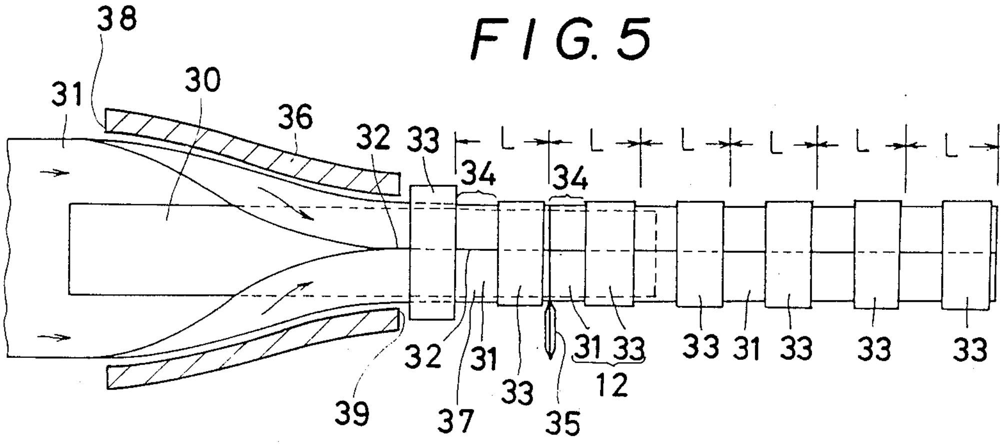
FIG. 5 is a partly cut-away plan view depicting a production process according to a second embodiment of this invention, which is suitable for the production of continuous bobbin stocks.
Figure 6:
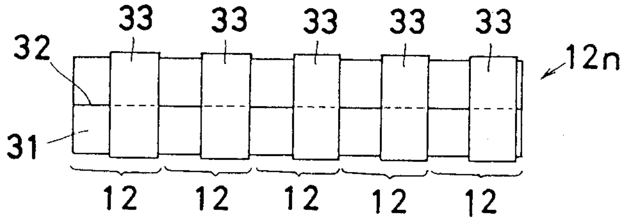
FIG. 6 is a plan view of a continuous bobbin stock produced by the process of FIG. 5.
Figure 7A:
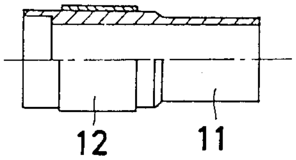
FIGS. 7(*a*) through 7(*c*) schematically illustrate a usual process for the production of a voice coil.
Figure 7B:
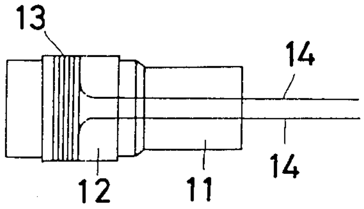
Figure 7C:
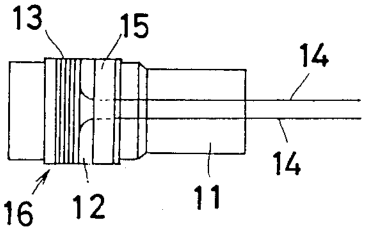
Figure 8:
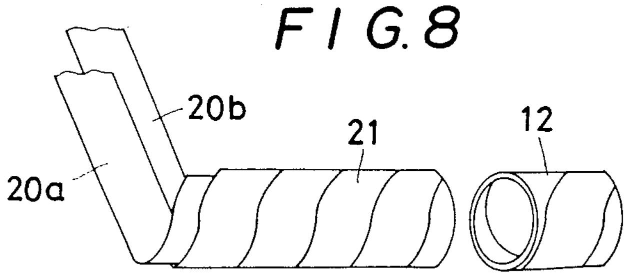
FIG. 8 is a schematic illustration of a conventional process for the production of bobbins suitable for use in voice coils.
Figure 9:
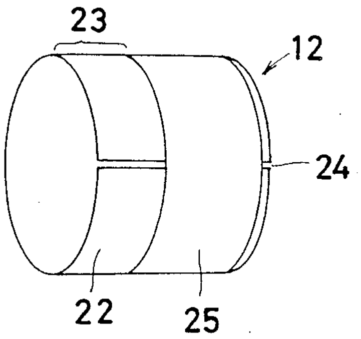
FIG. 9 is a perspective view illustrating another example of conventional bobbins for voice coils.
Figure 10:
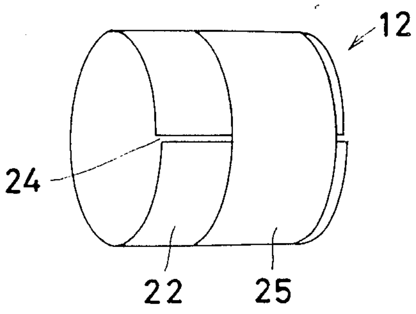
FIG. 10 is a perspective view showing a problem of the exemplified bobbin of FIG. 9.
Figure 11:
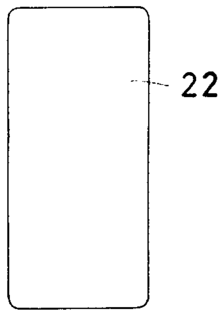
FIG. 11 is a plan view of a paper strip employed for the production of a further conventional bobbin.

The production method according to the second embodiment of this invention will next be described with reference to FIG. 5. The production process according to the second embodiment of this invention is similar to the above-described production process according to the first embodiment of this invention in that the bobbin tape 31 is formed into a cylindrical shape around the mandrel 30 while feeding it along the axis of the mandrel 30 having the circular cross-section and causing it to pass through the forming tube 36 and the shape-retaining tapes 33 are caused to adhere on the bobbin tape 31 formed into the cylindrical shape at intervals equal to the length of each bobbin so as to maintain the side edges 32 of the bobbin tape 31 in the abutted relationship. The process of the second embodiment is different from that of the first embodiment in that the bobbin tape 31 formed into the cylindrical shape and adhered with the shape-retaining tapes 33 are cut at intervals equal to the total length of plural bobbins. Although the bobbin tape 31 is cut at intervals equal to the total length of five bobbins in the illustrated embodiment, no particular limitation is imposed on the number of bobbins. According to the production process of the second embodiment, continuous bobbin stocks 12*n* in each of which plural bobbins 12 are connected together continually can be produced as depicted in FIG. 6. Each of the continuous bobbin stocks 12*n* may be used in the manufacture of voice coils after cutting it at intervals equal to the length of each bobbin. As an alternative, each continuous bobbin stock 12*n* may be used as is. In this case, coils are wound at the same time on the coil-winding portions of the individual bobbins of the continuous bobbin stock 12*n*, followed by its cutting at intervals equal to the length of each bobbin. This method is effective for the improvement of the productivity of voice coils. Incidentally, when the bobbin tape 31 formed into the cylindrical shape and adhered with the shape-retaining tapes 33 are cut at intervals equal to the total length of plural bobbins, the cutting may be conducted between the mandrel and cylindrical jig in the same manner as in FIG. 4.

The use of the cylindrical jig facilitates the connection of the bobbin-producing step to the subsequent coil-winding step, thereby bringing about a significant contribution to the automation of the overall process for the manufacture of voice coils.

I claim:

1. A process for the production of bobbins suitable for use in voice coils, which comprises:

gradually rolling a bobbin tape into a cylindrical shape around a mandrel having a circular cross-section while feeding the bobbin tape along the longitudinal axis of the mandrel, whereby both longitudinal edges of the bobbin tape are brought into an opposing relationship;

causing plural shape-retaining tapes to adhere on the bobbin tape, which has been formed into the cylindrical shape, at intervals equal to the length of each of the bobbins without covering coil-winding portions, so that both longitudinal edges of the bobbin tape are maintained in the opposing relationship; and cutting the bobbin tape, which has been formed into and maintained in the cylindrical shape, at intervals equal to the length of each of the bobbins from the leading end of the bobbin tape while leaving at least one shape-retaining tape on the side of the trailing end of the bobbin tape.

2. The process as claimed in claim 1, wherein both longitudinal edges of the bobbin tape are brought into abutment against each other.

3. The process as claimed in claim 1, wherein the bobbin tape is rolled into the cylindrical shape around the mandrel by causing the bobbin tape to pass through a cylindrically-shaping device.

4. The process as claimed in claim 1, wherein each of the shape-retaining tapes is caused to adhere on the bobbin tape while feeding the bobbin tape intermittently by a length equivalent to the length of each of the bobbins.

5. The process as claimed in claim 1, wherein the outside of the bobbin tape has been coated in advance with an adhesive- soluble in an alcohol and the insides of the shape-retaining tapes have been coated beforehand with an alcoholic solvent.

6. The process as claimed in claim 1, wherein the bobbin tape, which has been formed into and maintained in the cylindrical shape, is cut at intervals equal to the length of each of the bobbins on the mandrel.

7. The process as claimed in claim 1, wherein a cylindrical jig is arranged at a location advanced from the mandrel as viewed in the travelling direction of bobbin tape, a leading end portion of the bobbin tape formed into and maintained in the cylindrical shape is fit on the cylindrical jig, and the bobbin tape is cut at a position which is located between the mandrel and cylindrical jig and is apart from the leading end thereof by a distance equal to the length of each of the bobbins.

8. A process for the production of continuous bobbin stocks composed individually of plural bobbins suitable for use in voice coils, which comprises:

gradually rolling a bobbin tape into a cylindrical shape around a mandrel having a circular cross-section while feeding the bobbin tape along the longitudinal axis of the mandrel, whereby both longitudinal edges of the bobbin tape are brought into an opposing relationship;

causing plural shape-retaining tapes to adhere on the bobbin tape, which has been formed into the cylindrical shape, at intervals equal to the length of each of the bobbins without covering coil-winding portions of the bobbins, so that both longitudinal edges of the bobbin tape are maintained in the opposing relationship; and cutting the bobbin tape, which has been formed into and maintained in the cylindrical shape, at intervals equal to the total length of the plural bobbins from the leading end of the bobbin tape while leaving at least one shape-retaining tape on the side of the trailing end of the bobbin tape.

9. The process as claimed in claim 8, wherein both longitudinal edges of the bobbin tape are brought into abutment against each other.

10. The process as claimed in claim 8, wherein the bobbin tape is rolled into the cylindrical shape around the mandrel by causing the bobbin tape to pass through a cylindrically-shaping device.

11. The process as claimed in claim 8, wherein each of the shape-retaining tapes is caused to adhere on the bobbin tape while feeding the bobbin tape intermittently by a length equivalent to the length of each of the bobbins.

12. The process as claimed in claim 8, wherein the outside of the bobbin tape has been coated in advance with an adhesive soluble in an alcohol and the insides of the shape-retaining tapes have been coated beforehand with an alcoholic solvent.

13. The process as claimed in claim 8, wherein the bobbin tape, which has been formed into and maintained in the cylindrical shape is cut at intervals equal to the total length of the plural bobbins on the mandrel.

14. The process as claimed in claim 8, wherein a cylindrical jig is arranged at a location advanced from the mandrel as viewed in the travelling direction of bobbin tape, a leading end portion of the bobbin tape formed into and maintained in the cylindrical shape is fit on the cylindrical jig, and the bobbin tape is cut at a position which is located between the mandrel and cylindrical jig and is apart from the leading end thereof by a distance equal to the total length of the plural bobbins.

15. A process for the production of bobbins suitable for use in voice coils, which comprises:

gradually rolling a bobbin tape into a cylindrical shape around a mandrel having a circular cross-section while feeding the bobbin tape along the longitudinal axis of the mandrel, whereby both longitudinal edges of the bobbin tape are brought into an opposing relationship;

causing plural shape-retaining tapes to adhere on the bobbin tape, which has been formed into the cylindrical shape, at intervals equal to the length of each of the bobbins without covering coil-winding portions, so that both longitudinal edges of the bobbin tape are maintained in the opposing relationship;

cutting the bobbin tape, which has been formed into and maintained in the cylindrical shape, at intervals equal to the total length of plural ones of the bobbins from the leading end of the bobbin tape while leaving at least one shape-retaining tape on the side of the trailing end of the bobbin tape, whereby continuous bobbin stocks composed individually of the plural ones of the bobbins are formed; and cutting the continuous bobbin stocks at intervals equal to the length of each of the bobbins.

* * * * *

UNITED STATES PATENT AND TRADEMARK OFFICE

CERTIFICATE OF CORRECTION

PATENT NO. : 4,869,765

DATED : September 26, 1989

INVENTOR(S) : TOKICHI SHIMIZU ET AL.

It is certified that error appears in the above-identified patent and that said Letters Patent is hereby corrected as shown below:

On the cover page of the patent, the second named inventor's name should read --Kiyoshi Shimoyama--.

Signed and Sealed this

Thirteenth Day of November, 1990

*Attest:*

HARRY F. MANBECK, JR.

*Attesting Officer*

*Commissioner of Patents and Trademarks*